(12) United States Patent
Patel et al.

(10) Patent No.: US 6,848,082 B1
(45) Date of Patent: Jan. 25, 2005

(54) REACTOR-BASED VIEWPORT CLIPPING USING ARBITRARY GRAPHICAL ENTITIES

(75) Inventors: Anilkumar Kantilal Patel, Kentfield, CA (US); Nathan Earl Bender, Novato, CA (US)

(73) Assignee: Autodesk, Inc., San Rafael, CA (US)

( * ) Notice: Subject to any disclaimer, the term of this patent is extended or adjusted under 35 U.S.C. 154(b) by 541 days.

(21) Appl. No.: 09/464,558

(22) Filed: Dec. 16, 1999

(51) Int. Cl.[7] ................................................ G09G 5/00
(52) U.S. Cl. ...................... 715/788; 345/848; 345/781; 345/800; 345/852; 345/782
(58) Field of Search ................................ 345/848, 628, 345/664, 665, 679, 642, 653, 654, 419, 781, 788, 800, 852, 428, 782, 590, 620, 623, 624, 680, 738, 737

(56) References Cited

U.S. PATENT DOCUMENTS

| | | | | |
|---|---|---|---|---|
| 5,012,433 A | * | 4/1991 | Callahan et al. | 364/518 |
| 5,249,264 A | * | 9/1993 | Matsumoto | 345/434 |
| 5,268,677 A | * | 12/1993 | Frasier et al. | 345/427 |
| 5,329,613 A | * | 7/1994 | Brase et al. | 345/422 |
| 5,524,200 A | * | 6/1996 | Orton et al. | 345/157 |

* cited by examiner

*Primary Examiner*—Ba Huynh
*Assistant Examiner*—Mylinh Tran
(74) *Attorney, Agent, or Firm*—Gates & Cooper LLP

(57) ABSTRACT

Arbitrary graphical entities are used for reactor-based viewport clipping. Graphics program provide two dimensional views of three-dimensional objects through ports. A user obtains a non-rectangular shape (referred to as a clipping entity) to be utilized as a view or viewport of a model. Any arbitrary shape such as a circle, ellipse, polygon, or other non-rectangular shape may be utilized as a clipping entity. The user obtains a clipping entity by creating a new clipping entity or modifying an existing entity. Multiple options are available to the user to create and modify a clipping entity. A reactor mechanism detects changes in the clipping entity and notifies the current viewport of the modifications. In response thereto, the viewport adjusts its boundaries and any graphics outside of the clipping entity are clipped/not displayed to the user. Thus, a non-rectangular viewport may be displayed by a graphics program and utilized by the user.

22 Claims, 12 Drawing Sheets

500

600

600    602

600    602

900

904

900

902

904

900

US 6,848,082 B1

REACTOR-BASED VIEWPORT CLIPPING USING ARBITRARY GRAPHICAL ENTITIES

CROSS-REFERENCE TO RELATED APPLICATION(S)

This application is related to the following co-pending and commonly-assigned patent application(s), which are incorporated by reference herein:

Application Ser. No. 09/360,700, filed on Jul. 16, 1999, by Jack M. Bayt et al., entitled "VISUAL ANNOTATIVE CLIPPING IN A COMPUTER-IMPLEMENTEDC GRAPHICS SYSTEM", now U.S. Pat. No. 6,353,441, issued Mar. 5, 2002, attorney's docket number 30566.74US01.

BACKGROUND OF THE INVENTION

1. Field of the Invention

The present invention relates generally to computer-implemented graphics systems, and in particular, to clipping a portion of a drawing using an arbitrary graphical entity.

2. Description of the Related Art

Computer-implemented graphics systems have been widely used by designers, illustrators, drafters, and engineers for a number of years. Most such graphics systems use a two-dimensional (2D) graphical user interface (GUI) to display graphical images, such as 2D or three-dimensional (3D) models, schematic diagrams, photo-realistic images, etc. When a 3D object is displayed in a 2D GUI, the operator may desire to define the shape and structure of the viewing area. A viewport is a graphical entity, which displays a subset of the overall drawing (referred to as the viewport's contents) within its boundaries. Prior art methods do not provide the ability to define an arbitrary viewing area that is dynamically updated and based upon another arbitrary graphical entity.

SUMMARY OF THE INVENTION

One or more embodiments of the invention provide for reactor-based viewport clipping using arbitrary graphical entities. Graphics programs provide two-dimensional views of three-dimensional objects through viewports. Viewports are traditionally rectangular in shape and other shaped viewports cannot be utilized. One or more embodiments of the invention provide for a user to associate a graphical entity with a viewport and to utilize the entity's graphical definition to define the shape of the viewport. This graphical entity is referred to as the clipping entity. Any arbitrary shape such as a circle, ellipse, polygon, or other non-rectangular shape may be utilized as a clipping entity. In one or more embodiments, the user obtains a clipping entity by creating a new clipping entity or modifying an existing entity. Multiple options are available to the user to create and modify a clipping entity. The user associates a clip entity with a viewport. The graphics program attaches a reactor between the clip entity and the viewport. A reactor mechanism detects changes in the clipping entity and notifies the attached viewport of the modifications. In response thereto, the viewport adjusts its boundaries by utilizing the boundary of the clipping entity and any graphics outside of the clipping entity are clipped/not displayed to the user. Thus, a non-rectangular viewport may be displayed by a graphics program and utilized by the user.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide for a user to obtain a non-rectangular shape (referred to as a clipping entity) to be utilized as a view or viewport of a model. For example, the clipping entity may be obtained by creating a new clipping object or modifying an existing viewport. Multiple options are available to the user to create and modify a clipping entity. The clipping entity is associated with the viewport using a reactor mechanism. The reactor detects changes in the clipping entity and notifies the associated viewport of the modifications. In response thereto, the viewport adjusts its boundaries to coincide with the boundary of the clipping entity and any graphics outside of the boundary of the clipping entity are clipped/not displayed to the user.

Hardware and Software Environment

Figure 1:
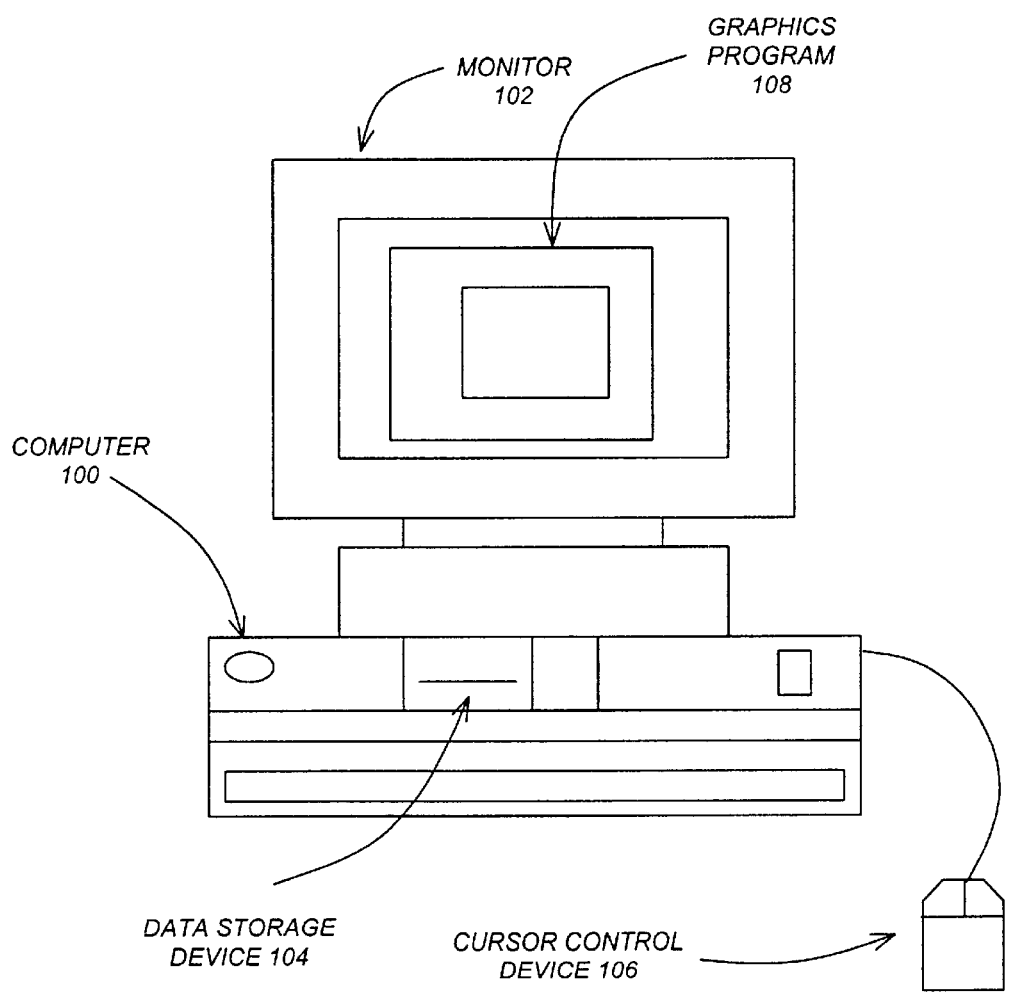
FIG. 1 is an exemplary hardware environment used to implement one or more embodiments of the invention.

FIG. 1 is an exemplary hardware and software environment used to implement one or more embodiments of the invention. One or more embodiments of the invention are typically implemented using a computer 100, which generally includes, inter alia, a monitor 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the monitor 102. Generally, the graphics program 108 comprises logic and/or data embodied in or readable from a device, media, or carrier, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
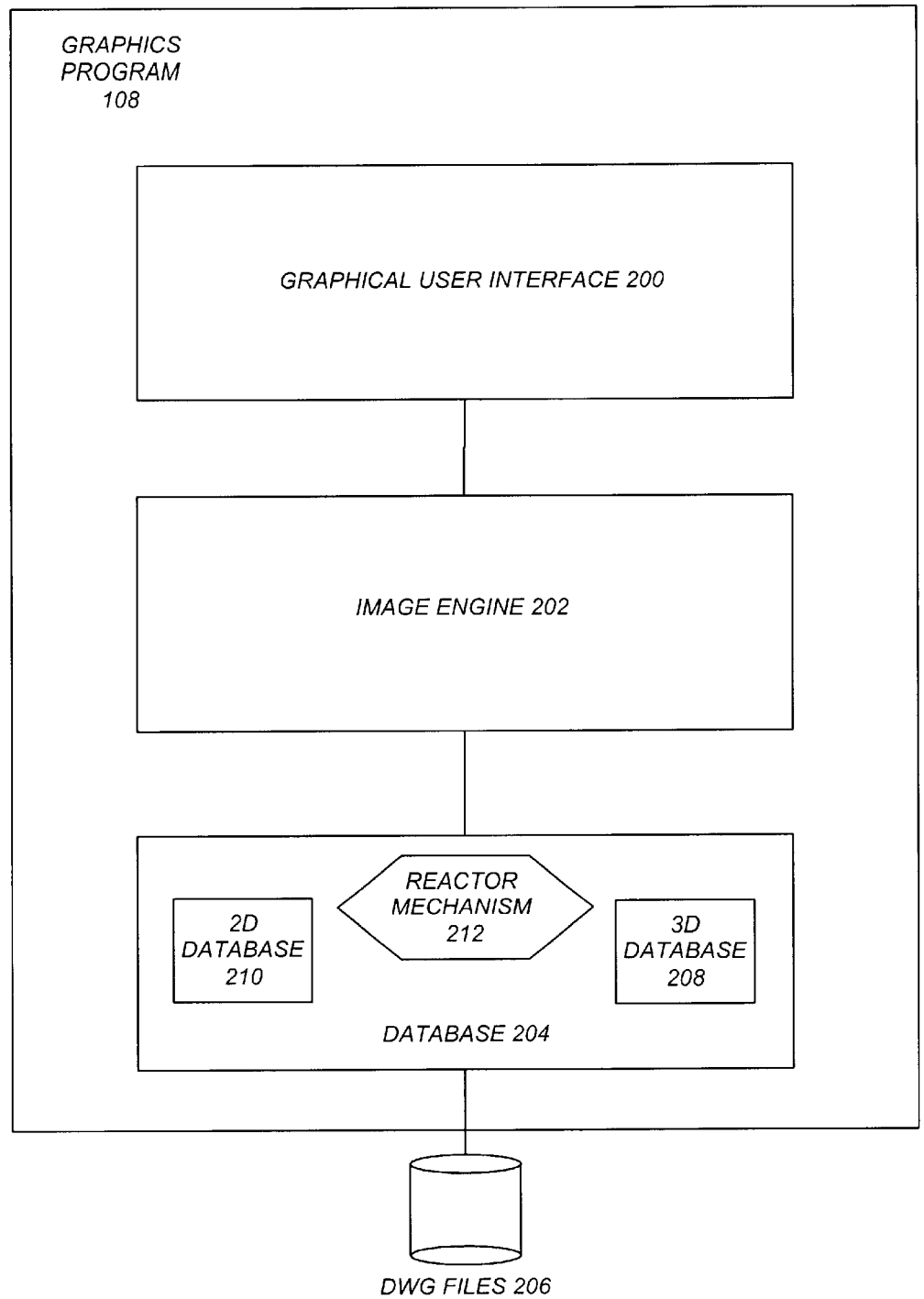
FIG. 2 is a block diagram that illustrates the components of the computer-implemented graphics program in accordance with one or more embodiments of the invention.

FIG. 2 is a block diagram that illustrates the components of the graphics program 108 in accordance with one or more embodiments of the invention. There are three main components to the graphics program 108, including: a Graphical User Interface (GUI) 200, an Image Engine (IME) 202, and a DataBase (DB) 204 for storing objects in Drawing (DWG) files 206. In one or more embodiments of the invention, Graphics program 108 and one or more of its components 200-206 may be implemented in an object oriented environment such that one or more of the components are represented by objects with methods and behavior. However, the invention may be implemented in any programming language, object oriented or otherwise, and is not limited in scope to an object-oriented environment.

The Graphical User Interface 200 displays information to the operator and provides the functionality for the operator's interaction with the graphics program 108.

The Image Engine 202 processes the DWG files 206 and delivers the resulting graphics to the monitor 102 for display. In the preferred embodiment, the Image Engine 202 provides a complete application programming interface (API) that allows other computer programs to interface to the graphics program 108 as needed.

The Database 204 is comprised of two separate types of databases: (1) a 3D database 208 known as the "3D world space" that stores 3D information; and (2) one or more 2D databases 210 known as the "2D view ports" that store 2D information derived from the 3D information. One or more 2D databases 210 may also store 2D objects to be utilized by or in combination with 2D viewports 210.

In accordance with one or more embodiments of the invention, Database 204 also contains Reactor Mechanism 212. Reactor Mechanism 212 is utilized to associate or link a 2D viewport 210 with another object (see details below).

Object List

Figure 3:
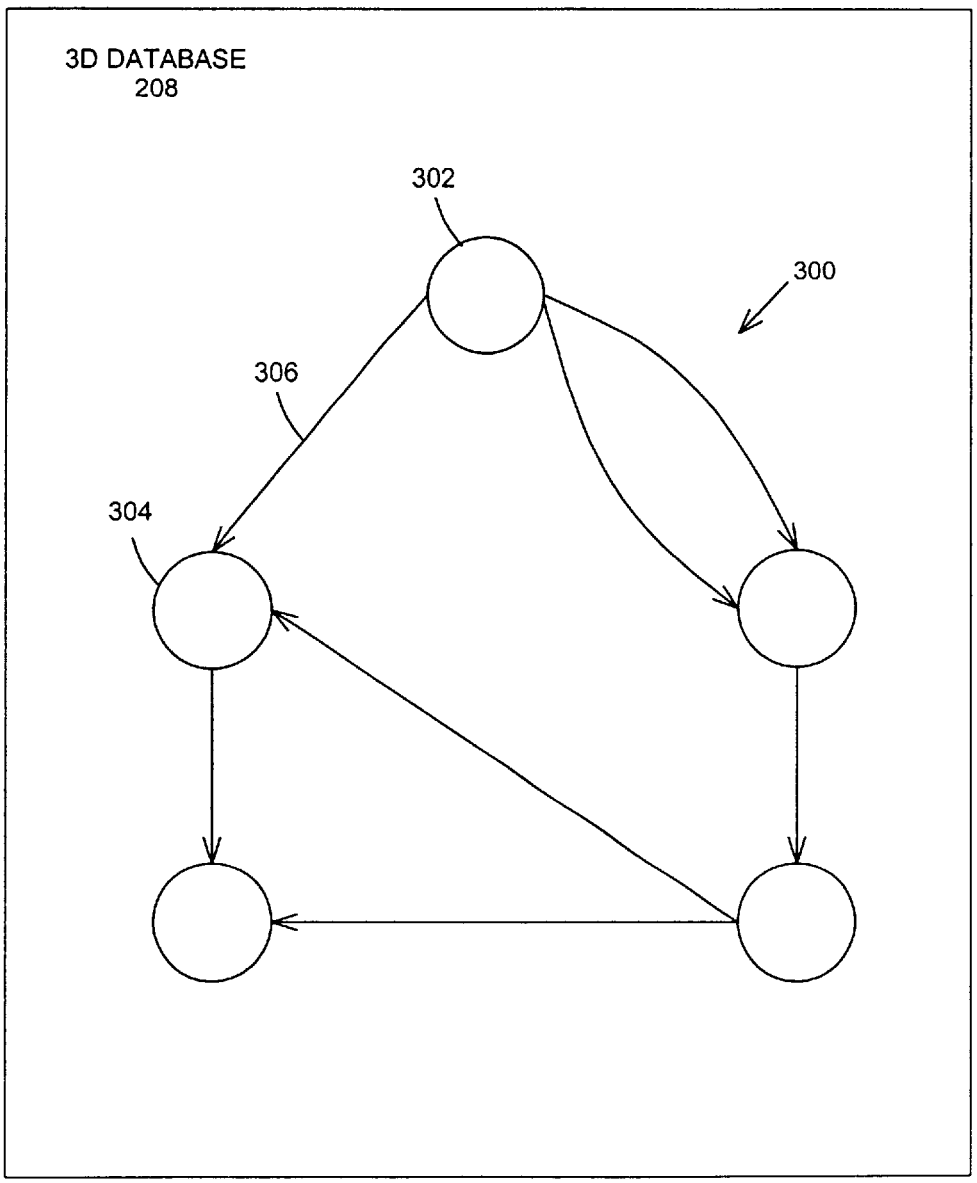
FIG. 3 is a block diagram that illustrates the structure of an object list maintained by each of the three-dimensional database of the computer-implemented graphics program in accordance with one or more embodiments of the invention.

FIG. 3 is a block diagram that illustrates the structure of an object list 300 maintained by the 3D databases 208 according to the preferred embodiment of the present invention. The object list 300 is usually comprised of a doubly linked list having a list head 302 and one or more objects 304 interconnected by edges 306, although other structures may be used as well. There may be any number of different object lists 300 maintained by the 3D databases 208. Moreover, an object 304 may be a member of multiple object lists 300 in the 3D databases 208.

Operation of the Graphics Program

An object or collection of objects in the 3D world space 208 is often referred to as a model. Consequently, the 3D world space 208 in which a model resides is referred to as a model space. A viewport 210 into the model space is often based on a movable user defined coordinate system (UCS). Some background of coordinate systems is useful to gain an understanding of the invention.

A Cartesian coordinate system has three axes: X, Y, and Z. When a user enters coordinate values (e.g., to specify a point in space), the user indicates a point's distance (in units) and its direction (+ or −) along the X, Y, and Z axes relative to the coordinate system origin (0,0,0) or relative to a previous point. The syntax utilized to define a point in space utilizes the format "(X,Y,Z)." In one or more embodiments of the invention, when a user opens a new viewport 210, the viewport 210 defaults to a world coordinate system (WCS): the X axis is horizontal, the Y axis is vertical, and the Z axis is perpendicular to the XY plane.

In addition to the WCS, a user can define a movable user coordinate system (UCS) with a different origin and axes in different directions. A UCS is defined in terms of the WCS.

As described above, model space is based on a UCS. A user may desire to view a model in model space from various perspectives (e.g., a top view, right and left side views, bottom view, etc.). To view a model in model space, a user may define and create one or more viewports 210. A viewport 210 is a bounded area that displays some portion of the model space of a model. Multiple viewports 210 provide different views of a model. For example, a user may set up viewports 210 that display a top view, right and left side views, and a bottom view. In one or more embodiments, to facilitate editing of the objects in the various views, a different UCS may be defined for each view/viewport 210.

Viewports 210 are normally defined and stored in database 204 as rectangles of different sizes. In addition to viewports 210 maintaining a rectangular shape, a user may desire to utilize a viewport 210 that is non-rectangular (e.g., a circle, an oval, or other arbitrary shape). One or more embodiments of the invention enable a user to define non-rectangular viewports 210 and utilize the non-rectangular viewports 210 to edit and work with a model. To provide for non-rectangular viewports 210, the user creates or retrieves the desired non-rectangular shape (referred to as a "clip entity"). The clip entity is a shape such as a circle, ellipse, polygon, or other arbitrary shape with a specified boundary. The clip entity is associated with the existing viewport 210 (e.g., by the user placing the shape over the desired area to be viewed) and the area outside of the clip entity is clipped (i.e., not displayed).

In one or more embodiments, Reactor Mechanism 212 is used to associate/link the viewport 210 with the clip entity. Reactor Mechanism 212 informs the viewport 210 of any modifications made to the clip entity that results in the graphics of the clip entity changing. Once informed, the viewport 210 queries the clip entity and update's the viewport's 210 size and position to encompass the clip entity's new graphical extents. Therefore any changes to the clip entity cause the viewport 210 to expand, contract, or move to accommodate the new graphical representation of the clip entity.

Creation and Use of Non-Rectangular Viewports 210

In one or more embodiments of the invention, users can create viewports 210 with irregular boundaries. The following description provides for one or more embodiments of such an invention. The boundary of a non-rectangular viewport 210 can consist of both arc and line segments or a circle. One or more embodiments of the invention achieves this functionality by allowing a boundary to be associated with a rectangular viewport 210 object and clipping the model space geometry in the viewport 210 to the edge of the boundary.

At the database level (e.g., in 2D database 210), the viewport 210 object itself remains rectangular, but embodiments of the invention make the viewport 210 appear non-rectangular by allowing components/objects of Image Engine 202 or Graphical User Interface 200 to clip the geometry at draw/display/plot time, rather than clipping the geometry at a higher level and sending down the clipped geometry to 2D Database 210, 3D Database 208, or DWG Files 206. Thus, the clipped geometry is not stored in database 204. Instead, the model and clipping entity are stored in database 208, the geometry of the non-rectangular viewport 210 is stored in database 210, and the clipping of the model (i.e., the combination of the non-rectangular viewport 210 with the model) occurs at draw/display/plot time. The distinction should be transparent to the user. There are two basic methods of creating "non-rectangular" viewports 210:

Creating new viewports 210 with irregular boundaries
Altering an existing viewport 210 by redefining its boundary
Creating New Non-Rectangular Viewports 210

Irregular shaped viewports 210 can be created by selecting an object to turn into a viewport 210, or by specifying a new irregular shaped boundary by picking points on the display screen displayed by graphics program 108 on monitor 102. In one or more embodiments, a -VPORTS command is also available (in an area that allows commands to be entered by a user) and includes two options named Object and Polygonal. To utilize the "-VPORTS" command, the command is entered into graphics program 108 and graphics program 108 responds by requiring the user to specify the corner of the viewport 210 or to utilize another option including: Fit, Object, Polygonal, or Restore.

Object Option

The Object option of the -VPORTS command prompts the user to select a clipping object such as a closed polyline, ellipse, spline, region, or circle. Thus, the user must select an object that will be utilized to clip the viewport 210.

When selecting a polyline to convert into a viewport 210, the polyline must be closed and contain at least 3 vertices. It can be self-intersecting. The polyline can contain arcs as well as line segments, so it can be a curved or a spline fit polyline. When regions are converted to viewport 210 objects, the object may consist of several loops, so it is possible that areas of the viewport 210 will have holes or the viewport 210 may consist of several disjoint areas. The object that defines the boundary is treated as part of the viewport 210, but will be listed as a separate object in database 210. When a non-rectangular viewport 210 is listed (in a selection of available viewports 210), the listing will list the viewport 210 object, followed by the clipping object.

When creating the irregularly shaped viewport 210, one or more embodiments of the invention calculate the extents (edges or points) of the object selected and places a viewport 210 object at the corners of the extents of the boundary. Graphics program 108 clips all geometry not within the specified boundary. By default, the view into the viewport 210 is calculated by performing a zoom extents on the model space geometry. Depending on the shape of the boundary, the model space geometry may not be fully displayed in the irregularly shaped viewport 210.

Figure 4A:
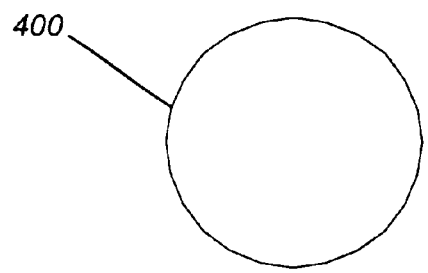
FIGS. 4A, 4B, and 4C illustrate the result of converting a circle into a circular viewport.
Figure 4B:
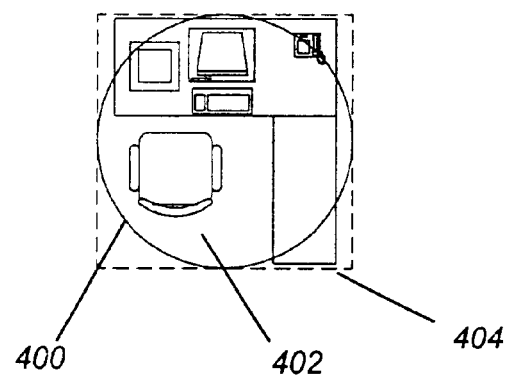
Figure 4C:
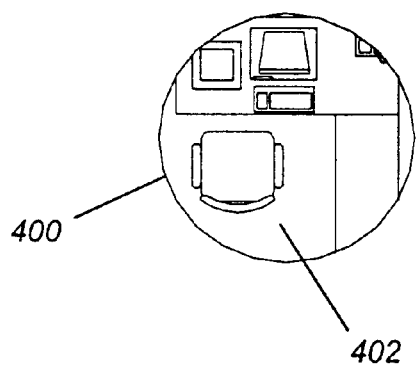

FIGS. 4A, 4B, and 4C illustrate the result of converting a circle into a circular viewport 210 and placing a viewport 210 object at the corners of the extents of a boundary. FIG. 4A illustrates clipping entity circle 400 that the user has selected. In FIG. 4B circle 400 is placed over model 402 and existing viewport 404. FIG. 4B also illustrates that viewport 404 is scaled to the extents of circle 400. In other words, viewport 404 is enlarged or scaled such that the edges of viewport 404 can encompass circle 400. In FIG. 4C the model is clipped such that any graphics outside of circle 400 are not displayed. After clipping, the resulting display provides for viewing model 402 through circle viewport 400. Thus, the underlying viewport 210 is created based on the extents of the circle with the model space geometry scaled to fit into the viewport 210, then it is clipped to the circular boundary.

Polygonal Option

The Polygonal option of the -VPORTS command allows the creation of an irregularly shaped viewport 210 by specifying points displayed on the screen (e.g., monitor 102). A user is prompted to specify the starting point for the viewport 210. The user is then prompted to specify one of the following several options: the next point, Arc, Close, Length, or Undo.

If the user selects the next point, the next point for the boundary must be specified. If the user selects the Arc option, the user is prompted to continue specifying the boundary for the arc (e.g., Angle, Center, Close, Direction, Line, Radius, Second pt, Undo, or Endpoint of arc). If after choosing three points, no option is chosen by the user, the boundary is automatically closed (e.g., a closed in area or boundary is created).

Altering an Existing Viewport 210 Boundary

Irregular shaped viewports 210 can also be created by redefining the boundary of an existing viewport 210. This is likely to be the most used method because users often need to see the geometry in a viewport 210 (e.g., a rectangular viewport 210) before they can accurately specify an irregular shaped boundary.

In one or more embodiments of the invention, a VPCLIP command is utilized to alter/edit an existing viewport 210. The VPCLIP command may also be utilized to clip existing viewport 210 objects. Upon entering the VPCLIP command, the user is prompted to select a viewport 210 that is to be clipped (e.g., viewport 404). The user then selects a clipping entity/object (e.g., clipping object 400) or a polygonal option. If the polygonal option is selected, the user must define the polygon that comprises the clipping entity. In one or more embodiments, the user must select the various points that make up the polygon. Consequently, the user is prompted to specify the starting point for the polygon.

When specifying a clip boundary by specifying the points of a polygon, arcs can be specified as well as straight line segments. For example, after specifying a starting point, the user can elect to specify the next point of the polygon, or an arc. Alternatively, after specifying a starting point, the user can elect to close the polygon, specify a length, or to undo the previous selection.

Grip Editing Irregular Viewports 210

In one or more embodiments, users can gripedit the clipping entity of a non-rectangular viewport in the same manner that a user can gripedit a clip entity if it was not associated with the viewport. Therefore, any mechanism that has previously been established to edit clip entities may be used to edit a non-rectangular viewport. Indeed to the user, the viewport appears as a clip entity that can be modified using established mechanisms such as gripediting. Gripediting is when a user selects (grips) a point on a model, and uses an input device (e.g., a mouse) to drag the point to a new location. Consequently, the shape of the object is changed based on where the user drags the point to. When stretching the vertices of an irregular boundary, the rectangular viewport 210 underneath the boundary is also transparently stretched, so there are no limits to the boundary.

If a rectangular boundary has been applied to a viewport 210 (e.g., with the CLIP command), the boundary is a polyline. Consequently, when the rectangular boundary is grip-edited, it will not retain its rectangular shape like an unclipped viewport 210. Users may wish to occasionally apply a rectangular clip boundary to a viewport 210 (instead of just of just sizing the viewport 210) because the behavior is different when the viewport 210 is rotated (see discussion below).

As described above, when creating an irregularly shaped viewport 210 (or altering a viewport 210 boundary (e.g., by gripediting)), one or more embodiments of the invention calculate the extents of the clip entity and place a viewport 210 object at the corners of the extents of the boundary. The graphics system clips all geometry not within the specified boundary. Depending on the shape of the boundary, the model space geometry may not be fully displayed in the irregularly shaped viewport 210.

Figure 5A:
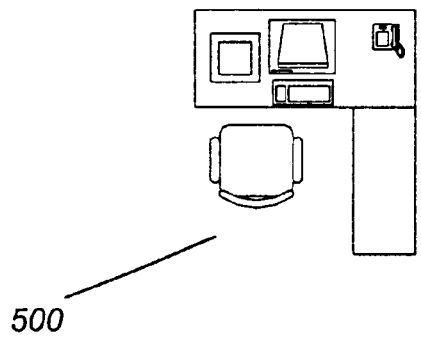
FIGS. 5A, 5B, and 5C illustrate the gripediting of a non-rectangular viewport in accordance with one or more embodiments of the invention.
Figure 5B:
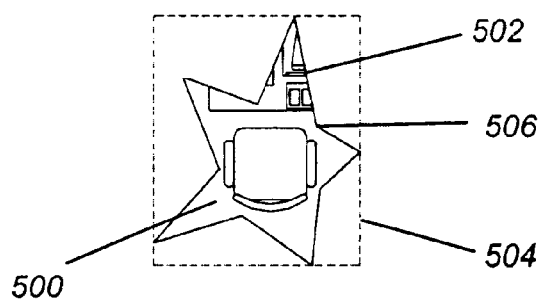
Figure 5C:
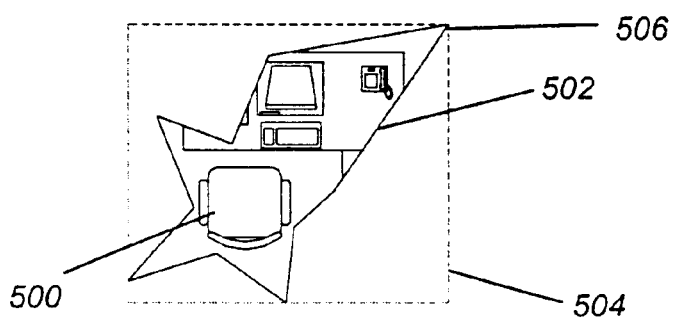

FIGS. 5A, 5B, and 5C illustrate the gripediting of a non-rectangular viewport 210 in accordance with one or more embodiments of the invention. FIG. 5A illustrates the model (i.e., model space geometry 500) selected by the user.

FIG. 5B illustrates rectangular viewport 504 that is initially used to view model space geometry 500. Non-rectangular viewport 502 is created on top of model space geometry 500 and the area outside of non-rectangular viewport 502 is clipped from display.

FIG. 5C illustrates the gripediting of a point of non-rectangular viewport 502. The user selects/grips point 506 of FIG. 5B and stretches point 506 (by moving the mouse while the point is selected) to its location in FIG. 5C. As can be seen in FIG. 5C, rectangular viewport 504 also stretches (transparently) to accommodate the stretching of non-rectangular viewport 502. Consequently, if non-rectangular viewport 502 were removed, rectangular viewport 504 would be sized differently than its original size.

Rotation of Non-Rectangular Viewports 210

Figure 6A:
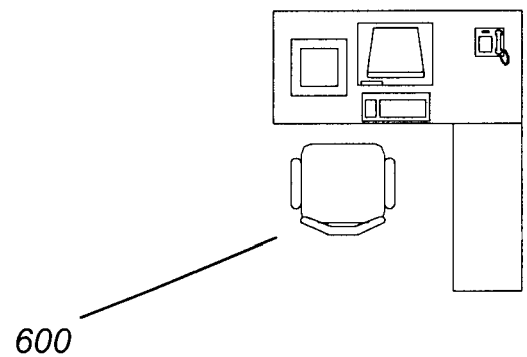
FIGS. 6A, 6B, and 6C illustrate the rotation of a non-rectangular viewport in accordance with one or more embodiments of the invention.
Figure 6B:
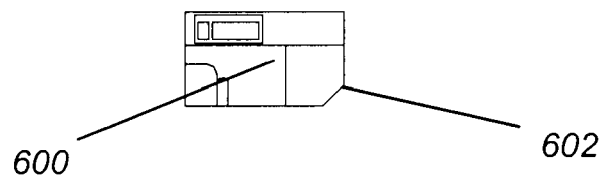
Figure 6C:
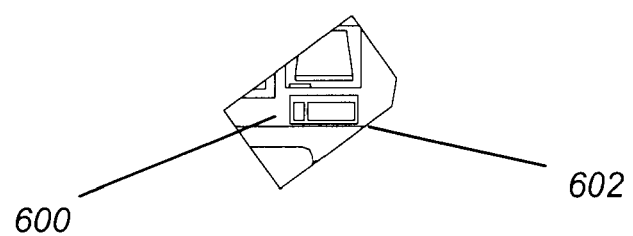

If a non-rectangular viewport 210 is rotated, only the boundary is rotated and the geometry is clipped based on the new location of the boundary. The model space geometry does not rotate with the boundary. FIGS. 6A, 6B, and 6C illustrate the rotation of a non-rectangular viewport 210 in accordance with one or more embodiments of the invention. In FIG. 6A, model geometry space 600 is illustrated.

In FIG. 6B, non-rectangular viewport 602 is created and areas outside of viewport 602 are clipped. In FIG. 6C, viewport 602 is rotated over model geometry space 600 and areas outside of rotated viewport 602 are clipped. As can be seen in FIG. 6C, model geometry space 600 remains in the same location as in FIGS. 6A and 6B. Only viewport 602 is rotated to view a different area of model geometry space 600 with a different area being clipped.

Differentiating the Current Viewport 210

In one or more embodiments of the invention, the active viewport 210 displays a rectangular border offset one pixel away from the outside edge of the viewport 210 to visually indicate the viewport 210 is current. However, if the result proves unsatisfactory for curved viewports 210, the current viewport 210 will display its boundary in a different color and heavier lineweight.

Zooming and Panning in Non-rectangular Viewports 210

When zooming or panning inside a non-rectangular viewport 210, the model space geometry is clipped on the fly in real-time. The user never sees geometry that would appear outside the boundary in the rectangular viewport 210 underneath the clip boundary. A Zoom Extents option performs a zoom extents of the model space geometry to the extents of the clipping boundary. This means that the model space geometry may not be fully displayed within the clipping boundary of the viewport 210 if it is an irregular shape. As with Zoom Extents, when a Zoom All or Zoom Limits option is utilized, some model space geometry may not be fully displayed within the clipping boundary of the viewport 210 if it is an irregular shape Printing Non-Rectangular Viewports 210

Tessellation is a method used to represent 3D objects as a collection of triangles or polygons. Using tessellation, all surfaces, both curved and straight, are turned into triangles or polygons either at the time they are first created or in realtime when they are rendered. In tessellation, the more triangles or polygons are used to represent a surface, the more realistic and smooth the rendering becomes. In one or more embodiments of the invention, tessellation of curved boundaries is calculated based on the resolution of the hardcopy device. Thus, the number of triangles or polygons that are used depends on the resolution of the plotting or printing device. Consequently, the curved viewports 210 will appear smooth when printing with clipping performed right next to the boundary edge.

Viewport Toolbar

Figure 7:
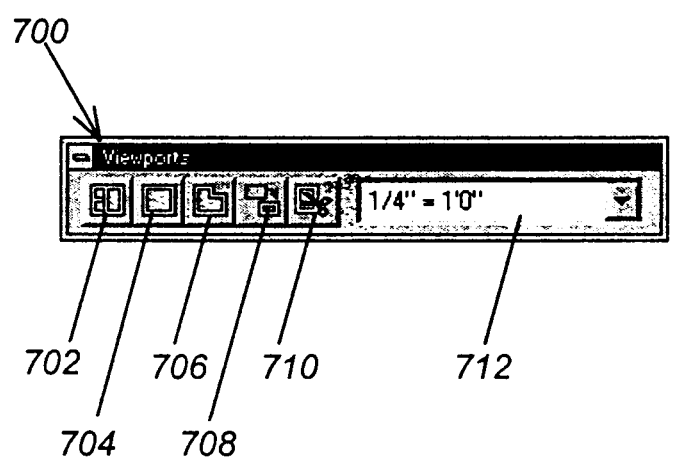
FIG. 7 illustrate a viewport toolbar in accordance with one or more embodiments of the invention.

One or more embodiments of the invention provide a toolbar that the user may utilize to create viewports 210, rectangular or nonrectangular. FIG. 7 illustrates such a toolbar in accordance with one or more embodiments of the invention. Layout Viewports toolbar 700 contains 5 buttons 702–710 and a viewport display scale combo box 712. Upon selecting one of the 5 buttons 702–710, different actions are taken depending on the button selected. Viewports dialog button 702 displays the viewport dialog enabling the user to create 1, 2, 3, or 4 viewports 210 with specified named views or viewpoint orientations and spacing between viewports 210. Button 704 creates a single viewport 210. Button 706 creates a polygonal viewport 210. Convert selected object into viewport button 708 allows the user to select a closed object in the layout and convert it into a viewport 210 (i.e. polygon, circle, ellipse, region, etc.). Clip viewport button 710 prompts the user to select a viewport 210 and specify a new clipping boundary or select an object to clip the viewport 210.

Viewport scale combo box control 712 allows the user to set the display scale (Zoom XP factor) of the current or selected viewport 210. Combo box 712 reflects the current paperspace's display scale. When a viewport 210 is made current, it displays the viewport's 210 display scale. If the scale is equal to one of the settings in the dropdown list, the control displays the item in the list. If the scale is not one of the preset scales, it displays the scale as a real number. The user can change the scale by selecting from one of the preset scales in the dropdown list, or type in a real number. The viewport 210 will zoom center to reflect the specified scale. When a viewport 210 is selected or made current, one or more embodiments of the invention will perform a lookup and display the equivalent scale in the dropdown if one exists. Otherwise it will just display the scale as a real number. The dropdown list will also include an MRU Most Recently Used) list (a list of the most recently used scalings).

By default control 712 displays Scaled to Fit when paperspace is current and a viewport 210 is not selected. If the CVPSCALE system variable is implemented, the value in the control (which reflects the CVPSCALE) is applied to newly created viewport 210 objects. The geometry in the viewports 210 will be centered in the viewport 210, and the appropriate Zoom XP factor applied when the viewport 210 is created. Implementing the CVPSCALE variable is a scalable task. If not implemented, the control will be disabled and display "Scaled to fit" when paper space is current. The viewport scale controls change the Zoom XP factor when a viewport 210 object is current. Changing the zoom factor of the viewport 210 updates the scale controls.

CLIP Command

The CLIP command allows the user to re-specify the boundary of an existing viewport 210 object (redefine the clipped view into model space), or clip Xrefs (short for external reference—a model file linked or attached to another model) or Images. This has the advantage of rationalizing three similar commands into one.

The CLIP command first prompts the user to select objects, then prompts the user to specify the first point of a clipping boundary (or enter one of the other available options). One or more embodiments of the invention allows multiple Xrefs to be clipped simultaneously, while only one image or viewport 210 can be clipped at one time. To accommodate the use of a single CLIP command on all three different types of objects (Xref, image, or viewport 210), the command may follow the following rules:

(1) If multiple objects are selected, the CLIP command will respond to the first valid object found (Xref, image, or viewport 210). If the first object is an Xref, all objects except Xrefs will be filtered out. If the first object is a viewport 210 or image, all other objects will be filtered out. To ensure the desired object is selected, the user should pick the objects directly instead of using a window or crossing.

(2) When clipping a viewport 210 that has already been clipped, the original clipping boundary is deleted and the new boundary is applied.

Clipping a Viewport 210

When a viewport 210 is selected, the user can specify the boundary in one of three ways:

(1) by picking points on the screen to create a polygonal boundary;

(2) by specifying two corners of a new rectangular boundary; or (3) by selecting an existing polyline or circle to become the new boundary.

After selecting a viewport 210, the user can immediately start picking points that define the boundary, or enter the Rectangular or Object options. The Rectangular option prompts the user for the opposing corners of a rectangle. Rectangular viewport 210 boundaries know they are rectangular, so when they are grip edited, they will maintain their rectangular shape.

Figure 8A:
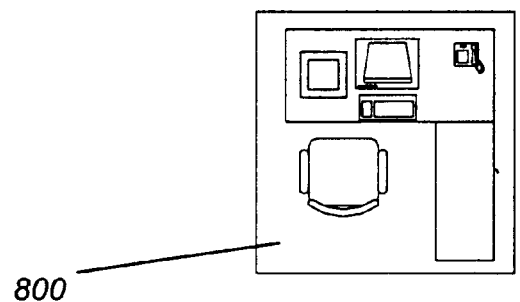
FIGS. 8A, 8B, and 8C illustrate the use of an object as a viewport in accordance with one or more embodiments of the invention.
Figure 8B:
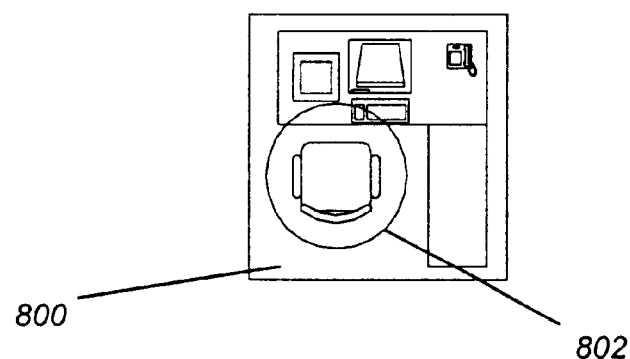
Figure 8C:
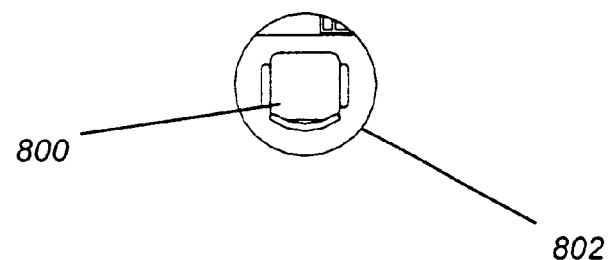

The Object option prompts the user to select a polyline or circle, then converts it into the boundary for the viewport 210. After ending the command, the boundary is applied to the viewport 210. The view stays fixed relative to the original boundary as shown in FIGS. 8A, 8B, and 8C. FIG. 8A illustrates model geometry space 800. FIG. 8B illustrates an object circle 802 selected by the user that is placed over model space geometry 800. FIG. 8C illustrates how the boundary is applied to object 802 and graphics outside of the boundary are clipped.

Figure 9A:
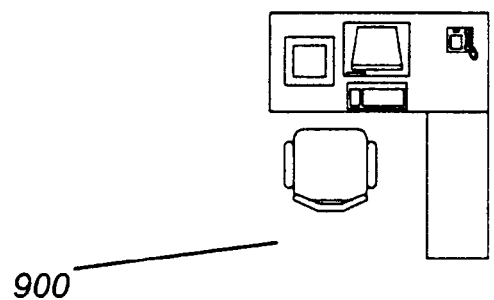
FIGS. 9A, 9B, and 9C illustrate the creation of a viewport outside of an existing viewport in accordance with one or more embodiments of the invention.
Figure 9B:
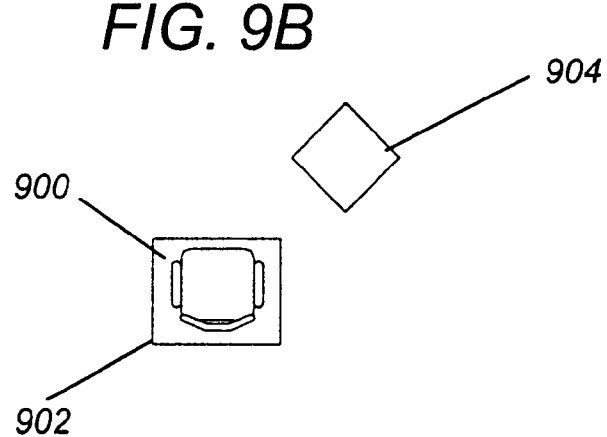
Figure 9C:
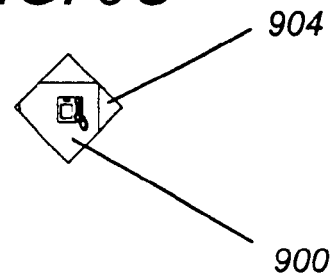

Even if the viewport 210 boundary is created outside the existing viewport 210, the new clipping boundary will be applied without shifting the model space geometry as shown in FIGS. 9A, 9B, and 9C. FIG. 9A illustrates model space geometry 900. FIG. 9B illustrates existing viewport 902 and the new diamond clipping object 904 that the user has created. FIG. 9C illustrates when object 904 has been converted to a viewport 210 and clipped.

The Delete option removes a clipping boundary if the viewport 210 is already clipped. The boundary object is deleted, but the object can be converted back as a polyline, ellipse, etc. (however it was originally defined).

Logic of the Graphics Program

Figure 10:
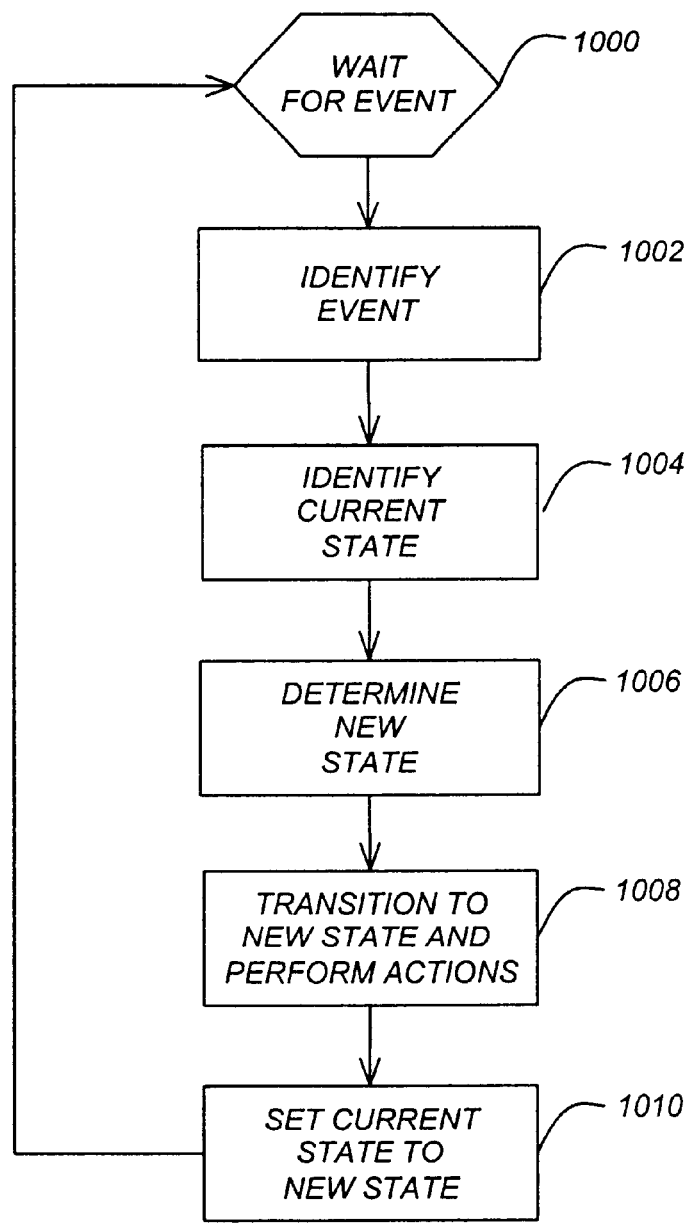
FIG. 10 is a flowchart that illustrates the general logic of a message or event-driven computer-implemented graphics program performing the steps of one or more embodiments of the invention.

A flowchart that illustrates the logic of the graphics program 108 in accordance with one or more embodiments of the invention is shown in FIG. 10. Those skilled in the art will recognize that this logic is provided for illustrative purposes only and that different logic may be used to accomplish the same results.

FIG. 10 is a flowchart that illustrates the general logic of a message or event-driven graphics program 108 performing the steps of one or more embodiments of the invention. In such a graphics program 108, operations are performed when transitions are made, based upon the receipt of messages or events, from present or current states to new states.

Generally, the flowchart begins by waiting at block 1000 for an event (e.g., a mouse button click). It should be appreciated that, during this time, other operating system 116 tasks, e.g., file, memory, and video tasks, etc., may also be carried out. When an event occurs, control passes to block 1002 to identify the event. Based upon the event, as well as the current state of the graphics program 108 determined in block 1004, a new state is determined in block 1006. In block 1008, the logic transitions to the new state and performs any actions required for the transition. In block 1010, the current state is set to the previously determined new state, and control returns to block 1000 to wait for more input events.

The specific operations that are performed by block 1008 when transitioning between states will vary depending upon the current state and the event. The various operations required to implement and maintain one or more embodiments of the invention represent particular events handled by the logic. However, it should be appreciated that these operations represent merely a subset of all of the events handled by the computer 100.

As described above, one or more embodiments of the invention provide for a technique of generating or obtaining a non-rectangular viewport 210 using a viewport 210 (the "viewport") and an arbitrary closed graphical entity (the "clip entity") connected by a reactor-based mechanism.

In one or more embodiments of the invention, the clip entity can be any closed graphical entity, but can also be open as long as its boundary can be closed via a closure algorithm. Some examples of clip entities are: polylines, circles, splines, ellipses, and solid regions. The clip entities may be stored in 3D database 208. The clip entity's 2D graphical boundary is extracted from the 2D database 210 to generate a clipping boundary, which is passed to Image Engine 202. Image Engine 202 receives the clipping boundary and utilizes clipping code to clip the contents of the viewport 210. Any graphics that are inside of the viewport 210, but "outside" of the clip entity's graphical boundary are not displayed.

Reactor Mechanism 212 is used to link the viewport 210 with the clip entity. Reactor Mechanism 212 informs the viewport 210 of any modifications made to the clip entity that result in the graphics of the clip entity changing. Once informed, the viewport 210 queries the clip entity and updates the viewport's 210 size and position to encompass the clip entity's new graphical extents. Therefore, any changes to the clip entity cause the viewport 210 to expand, contract, or move to accommodate the new graphical representation of the clip entity.

The novel approach to having separate clip entities and viewports 210 allows the viewport 210 to be clipped by any entity available in a graphics program easily. Allowing more entities to clip viewport 210 objects requires no extra work on the entity author's part. Reactor Mechanism 212 allows the viewport 210 to update its clipping area whenever the clip entity is modified without having to know intricate details about the clip entity, its acquisition, or its editing mechanisms. For example, suppose the clip entity is a circle. Graphics program 108 might already have mechanisms to change the circle's center point or radius via interactive grip editing or through a property sheet. The viewport 210 does not need to be aware of these editing mechanisms. It is notified by the Reactor Mechanism 212 when the modifications are complete, and then it updates its clip region by re-extracting the clip entity graphical boundary and passing this to the graphics system viewport 210 clip code within Image Engine 202.

Figure 11:
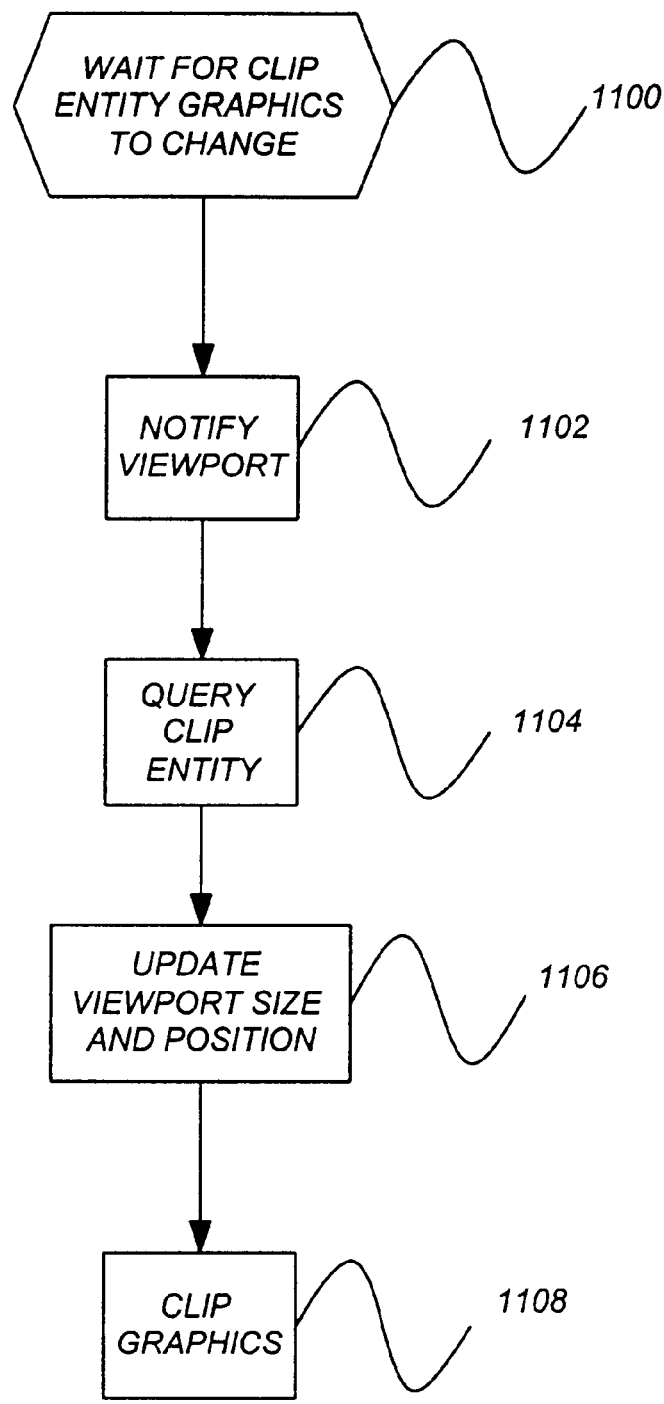
FIG. 11 is a flow chart illustrating non-rectangular viewport creation and modification in accordance with one or more embodiments of the invention.
Figure 12A:
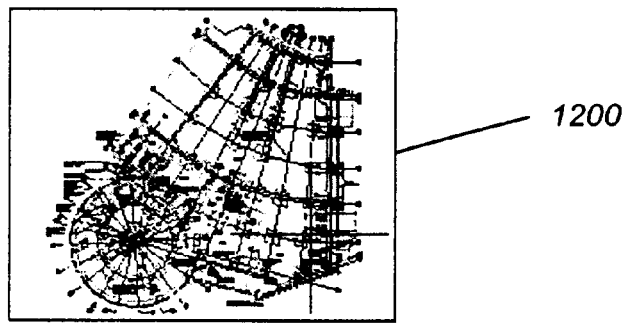
FIGS. 12A, 12B, and 12C illustrate non-rectangular viewport creation in accordance with one or more embodiments of the invention.
Figure 12B:
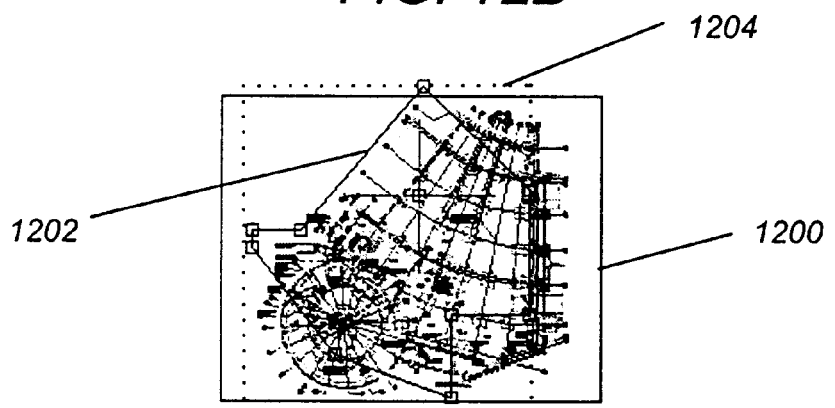
Figure 12C:
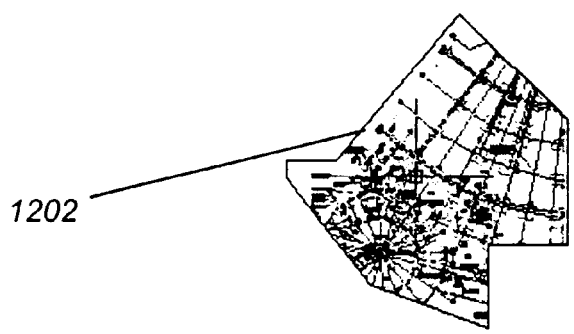

FIG. 11 is a flow chart illustrating non-rectangular viewport 210 creation and modification as illustrated in FIGS. 12A, 12B, and 12C in accordance with one or more embodiments of the invention. At step 1100, graphics program 108 waits for the currently active clip entity's graphics to change. A viewport 1200 with no associated clip entity is shown in FIG. 12A. In FIG. 12B the user creates a new clip entity 1202 (in this case a polyline) and associates it with viewport 1200 (e.g., by selecting clip viewport button 710 from toolbar 700, or using the VPCLIP command). The user may also modify the clip entity 1202 boundaries using the a polyline edit command such as PEDIT or use gripediting.

At step 1102, Reactor Mechanism 212 notifies/informs the viewport 210 of the creation/modifications in the clip entity's graphics. Once informed, the viewport 210 queries the clip entity to obtain the new extents, if any, of the clip entity at step 1104. For example, in FIG. 12B, some of the clip entities new extents are indicated by dotted lines 1204. The viewport's 210 size and position are updated to encompass the clip entity's new graphical extents at step 1106. Thus, in FIG. 12B, if viewport 1200 were updated to encompass the clip entity's new graphical extents, portions of viewport 1200 would be extended to the dotted lines 1204. At step 1108, graphics inside of the viewport 210 but outside of the clip entity's graphical boundary are clipped (not displayed). FIG. 12C illustrates the result of clipping the graphics outside of polygonal clipping entity 1202.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or operating system providing graphical functions could benefit from the present invention.

In summary, the present invention discloses the use of a reactor mechanism to detect changes in a clipping entity and notifies the viewport 210 which adjusts its boundaries and clips the graphics accordingly. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for providing a viewport for navigating a three-dimensional space represented in a computer-implemented graphics system, comprising:

(a) associating a non-rectangular clipping entity with a two-dimensional viewport of a model maintained within the three-dimensional space represented in the computer-implemented graphics system;

(b) displaying the two-dimensional viewport of the model on a display device connected to the computer-implemented graphics system, wherein any portions of the model outside the two-dimensional viewport's boundaries are clipped by the clipping entity so that the portions are not displayed on the display device; and (c) detecting changes in the clipping entity and modifying the two-dimensional viewport's boundaries in accordance with the detected changes, so that any portions of the model outside the modified two-dimensional viewport's boundaries are clipped by the clipping entity so that the portions are not displayed on the display device.

2. A computer-implemented method for viewing a three-dimensional space represented in a computer-implemented graphics system, comprising:

determining if graphics of a non-rectangular clip entity have changed;

notifying a viewport when said clip entity's graphics have changed, wherein the viewport displays model space of a three-dimensional model;

obtaining a boundary of said clip entity;

updating a boundary of said viewport based on said boundary of sad clip entity, wherein subsequent to updating the boundary of the viewport is non-rectangular in shape; and clipping contents outside of said boundary of said viewport.

3. The method of claim 2 wherein said clip entity's graphics have changed when:

a new clip entity is created by a user; and said user selects the new clip entity as a viewport.

4. The method of claim 2 wherein said clip entity's graphics have changed when a user modifies the boundary of said clip entity.

5. The method of claim 4 wherein said user modifies said boundary of said clip entity by gripediting.

6. The method of claim 2 wherein said user modifies said graphics of said clip entity by rotating said clip entity and wherein said rotating does not rotate contents being viewed through said viewport.

7. The method of claim 2 further comprising:

obtaining one or more extents of the clip entity's graphics; and updating the boundary of the viewport based on the one or more extents.

8. The method of claim 2 wherein graphics of the clip entity have changed when a user modifies the boundary of the viewport, said method further comprising:

creating a new clip entity based on said modified boundary; and associating said new clip entity with the viewport.

9. A computer-implemented graphics system for viewing a three-dimensional space comprising:

a computer having a monitor attached thereto;

a graphics program executing on said computer;

a non-rectangular clip entity of said graphics program;

a viewport of said graphics program, said viewport configured to:

display model space of a three-dimensional model;

obtain a boundary of said clip entity; and update a boundary of said viewport based on said boundary of said clip entity, wherein subsequent to updating, the boundary of the viewport is non-rectangular in shape;

a reactor mechanism of said graphics programs, said reactor mechanism configured to notify said viewport when graphics of said clip entity have changed; and means, performed by the graphics program for clipping contents outside of said updated boundary of said viewport.

10. The computer-implemented graphics system of claim 9 wherein said graphics of said clip entity have changed when:

said clip entity is newly created by a user; and said user selects the clip entity as a viewport.

11. The computer-implemented graphics system of claim 9 wherein graphics of said clip entity have changed when a user modifies the boundary of said clip entity.

12. The computer-implemented graphics system of claim 11 wherein said user modifies said boundary of said clip entity by gripediting.

13. The computer-implemented graphics system of claim 11 wherein said user modifies said boundary of said clip entity by rotating said clip entity and wherein said rotating does not rotate contents being viewed through said viewport.

14. The computer-implemented graphics system of claim 9 wherein said viewport is further configured to:

obtain one or more extents of the clip entity's graphics; and update the boundary of the viewport based on the one or more extents.

15. The computer-implemented graphics system of claim 9 wherein graphics of the clip entity have changed when a user modifies the boundary of the viewport, said graphics program further configured to create a new clip entity based on said modified boundary, and said reactor further configured to associate said new clip entity with the viewport.

16. An article of manufacture embodying logic for viewing a three-dimensional space represented in a computer-implemented graphics system, the logic comprising:

determining if graphics of a non-rectangular clip entity have changed;

notifying a viewport we said clip entity's graphics have changed, wherein the viewport displays model space of a three-dimensional mode;

obtaining a boundary of said clip entity's graphics;

updating a boundary of said viewport based on said boundary of said clip entity's graphics, wherein subsequent to updating, the boundary of the viewport is non-rectangular in shape; and clipping contents outside of said boundary of said viewport.

17. The article of manufacture of claim 16 wherein said clip entity's graphics have changed when:

a new clip entity is created by a user; and said user selects the new clip entity as a viewport.

18. The article of manufacture of claim 16 wherein said clip entity's graphics have changed when a user modifies the boundary of said clip entity.

19. The article of manufacture of claim 18 wherein said user modifies the boundary of said clip entity by gripediting.

20. The article of manufacture of claim 18 wherein said user modifies said graphics of said clip entity by rotating said clip entity and wherein said rotating does not rotate contents being viewed through said viewport.

21. The article of manufacture of claim 16 wherein said logic further comprises:

obtaining one or more extents of the clip entity's graphics; and updating the boundary of the viewport based on the one or more extents.

22. The article of manufacture of claim 16 wherein graphics of the clip entity have changed when a user modifies the boundary of the viewport, said logic further comprising:

creating a new clip entity based on said modified boundary; and associating said new clip entity with the viewport.

* * * * *

UNITED STATES PATENT AND TRADEMARK OFFICE
CERTIFICATE OF CORRECTION

PATENT NO. : 6,848,082 B1
DATED : January 25, 2005
INVENTOR(S) : Patel et al.

It is certified that error appears in the above-identified patent and that said Letters Patent is hereby corrected as shown below:

Title page,
Item [57], ABSTRACT,
Line 2, "program" should read -- programs --.
Line 3, "ports" should read -- viewports --.

Column 1,
Line 12, "COMPUTER-IMPLEMENTEDC" should read -- COMPUTER-IMPLEMENTED --.

Column 12,
Line 41, "sad" should read -- said --.

Column 13,
Line 18, "programs" should read -- program --.

Column 14,
Line 9, "we" should read -- when --.
Line 11, "mode" should read -- model --.

Signed and Sealed this

Fifth Day of July, 2005

JON W. DUDAS
*Director of the United States Patent and Trademark Office*